United States Patent
Tang et al.

(10) Patent No.: US 11,419,045 B2
(45) Date of Patent: Aug. 16, 2022

(54) AUTOMATIC EVALUATION AND MANAGEMENT OF SLICE RESELECTION EXPERIENCES

(71) Applicant: NOKIA SOLUTIONS AND NETWORKS OY, Espoo (FI)

(72) Inventors: Haitao Tang, Espoo (FI); Kaj Peter Stenberg, Sundsberg (FI)

(73) Assignee: Nokia Solutions and Networks Oy, Espoo (FI)

( * ) Notice: Subject to any disclaimer, the term of this patent is extended or adjusted under 35 U.S.C. 154(b) by 201 days.

(21) Appl. No.: 16/641,194

(22) PCT Filed: Aug. 23, 2017

(86) PCT No.: PCT/EP2017/071256
§ 371 (c)(1),
(2) Date: Feb. 21, 2020

(87) PCT Pub. No.: WO2019/037849
PCT Pub. Date: Feb. 28, 2019

(65) Prior Publication Data
US 2021/0368431 A1 Nov. 25, 2021

(51) Int. Cl.
*H04W 48/18* (2009.01)
*G06K 9/62* (2022.01)
(Continued)

(52) U.S. Cl.
CPC .......... *H04W 48/18* (2013.01); *G06K 9/6215* (2013.01); *G06K 9/6262* (2013.01); *H04W 8/18* (2013.01); *H04W 24/02* (2013.01); *H04W 48/20* (2013.01)

(58) Field of Classification Search
CPC . H04W 48/18; H04W 24/02; H04W 72/0453; H04W 48/20; H04W 8/18; G06K 9/6215; G06K 9/6262
See application file for complete search history.

(56) References Cited

U.S. PATENT DOCUMENTS

2017/0054595 A1   2/2017  Zhang et al.
2017/0086118 A1*  3/2017  Vrzic ................ H04W 36/26
(Continued)

FOREIGN PATENT DOCUMENTS

WO   WO-2016150627   9/2016
WO   WO-2016192746   12/2016
(Continued)

OTHER PUBLICATIONS

Samdanis, et al., 5G Network Slicing—Part 2: Algorithms and practice, IEEE Communications Magazine, 2017, pp. 110-111, vol. 55, No. 8.
(Continued)

*Primary Examiner* — Margaret G Mastrodonato
(74) *Attorney, Agent, or Firm* — Mintz Levin Cohn Ferris Glovsky and Popeo, P.C.

(57) ABSTRACT

A method includes learning, by at least one device associated with a slice selection function, a slice reselection decision for at least one self-operation case. The method includes determining, by the at least one device associated with the slice selection function, whether an evaluation condition for at least one new self-operation case has been met. The at least one new self-operation case includes the at least one self-operation case. The method also includes requesting, at least one device associated with a management function, evaluate the at least one new self-operation case in response to determining that the evaluation condition has been met, receiving evaluation results from the at least one device associated with the management function, and learning the evaluation results.

16 Claims, 8 Drawing Sheets

(51) Int. Cl.
  *H04W 8/18* (2009.01)
  *H04W 24/02* (2009.01)
  *H04W 48/20* (2009.01)

(56) References Cited

U.S. PATENT DOCUMENTS

2018/0310238 A1* 10/2018 Opsenica .............. H04W 12/06
2020/0053834 A1*  2/2020 Dahan ................. H04L 41/0886

FOREIGN PATENT DOCUMENTS

| WO | WO-2017005208 A1 | 1/2017 |
| WO | WO-2017012402 A1 | 1/2017 |
| WO | WO-2017063708 A1 | 4/2017 |
| WO | WO-2019149368 A1 | 8/2019 |

OTHER PUBLICATIONS

European Patent Office, International Search Report and Written Opinion for PCT/EP2017/071256, dated 2017, 15 pages.
3rd Generation Partnership Project; Technical Specification Group Services and System Aspects; Study on Architecture for Next Generation System; (Release 14), 3GPP TR 23.799 v14.0.0 (Dec. 2016). 522 pages.
3rd Generation Partnership Project; Technical Specification Group Services and System Aspects; System Architecture for the 5G System; Stage 2; (Release 15), 3GPP TS 23.501 v0.3.1 (Mar. 2017). 97 pages.
3rd Generation Partnership Project; Technical Specification Group Services and System Aspects; Procedures for the 5G System; Stage 2; (Release 15), 3GPP TS 23.502 v02.20 (Feb. 2017). 71 pages.
China Mobile, "Update of Interim Agreements on Network Slicing," SA WG2 Meeting #S2-117, S2-165659, Kaohsiung City, Taiwan, Oct. 17-21, 2016. 4 pages.
De Foy, X. et al., "Network Slicing—3GPP Use Case," InterDigital Communications, LLC, Mar. 6, 2017. 9 pages.
Huawei et al., "Interim Agreements for KI 6," 3GPP TSG SA WG2 Meeting #117, S2-165899, Kaohsiung City, Taiwan, Oct. 17-21, 2016. 3 pages.
Kim, J. et al., 3GPP SA2 architecture and functions for 5G mobile communication system, ICT Express.
LG Electronics Inc., "Clarification and evaluation on Solution 1.8," SA WG2 Meeting #117, S2-165615, Kaohsiung City, Taiwan, Oct. 17-21, 2016. 8 pages.

* cited by examiner

600 

| | TABLE 1 | |
|---|---|---|
| Data Element 610 | Definition and attribute 620 | Transmit 630 |
| selectionExp 640 | Category name for a slice reselection experience. | Sent between itf-N/S interface |
| Device Model 645 | Experience domain name for a specific part of experience(s) concerning UE's product name and firmware. | Sent among itf-N/S and OSS-BSS |
| Application 650 | Experience domain name for a specific part of experience(s) concerning application. | Sent among itf-N/S and OSS-BSS |
| User Sub 655 | Experience domain name for a specific part of experience(s) concerning user subscription or Subscription Type α. | Sent among itf-N/S and OSS-BSS |
| MO 660 | The experience domain name for a specific part of experience(s) concerning a management object. | Sent among itf-N/S and OSS-BSS |
| Attribute 665 | Name of an attribute of an experience domain. | Sent among itf-N/S and OSS-BSS |
| Self-operation case 670 | An experience data instance sent through interface between a slice selection function and a management plane function. | Sent between itf-N/S interface |
| Element of self-operation case 675 | Name of an element/attribute of a self-operation case, sent with its value as an instance through interface between slice selection and management plane function. | Sent between itf-N/S interface |
| URI of self-operation case 680 | URI of a self-operation case, sent through interface between a slice selection function and a management plane function. | Sent between itf-N/S interface |
| Validity 685 | Name of an attribute indicating the obsolescence or validness of a self-operation case, sent together with its value as. | Sent between itf-N/S interface |

Fig. 6

AUTOMATIC EVALUATION AND MANAGEMENT OF SLICE RESELECTION EXPERIENCES

CROSS-REFERENCE TO RELATED APPLICATIONS

This application is a national stage filing of International Application No.: PCT/EP2017/071256, filed Aug. 23, 2017, entitled "AUTOMATIC EVALUATION AND MANAGEMENT OF SLICE RESELECTION EXPERIENCES", the contents of which are herein incorporated by reference in their entirety.

TECHNOLOGICAL FIELD

The exemplary and non-limiting embodiments relate generally to wireless networks and, more specifically, relates to internetworking procedures in such networks.

BACKGROUND 5G architecture design in 3GPP includes how to (re-)select a network slice for a UE. The network side (for example, a slice selection function such as a CCNF function) may configure/inform the available tenant(s) and slice(s)/service(s) for a UE to access, via an NSSAI-based solution or equivalent corresponding MDD-based solution. The UE may thereby indicate its preferred tenant and service/slice type from the informed available tenant(s) and slice(s)/service(s), for example, to a slice selection function (for example, CCNF function). In this way, an UE application type may associate with its corresponding network service type. For example, a particular application type (for example, a medical application type) may be associated to a particular service type (for example, a service type such as Critical Communications (CriC)). The medical application of the UE may then access the corresponding slice for the CriC service provided by a tenant. The UE may also be able to reselect another slice/service for the given application when the UE needs to do so and the network allows it.

Certain abbreviations that may be found in the description and/or in the Figures are herewith defined as follows:
3GPP Third Generation Partnership Project
5G 5th generation mobile networks (or wireless systems)
BSS Business support system
CCNF Common Control Plane Network Function
CDP Connected Device Platform
gNB gNodeB
GPRS General Packet Radio Service
GTP GPRS Tunnelling Protocol
IMSI International Mobile Subscriber Identity
Itf Interface
LTE Long Term Evolution
MDD Multi-Dimensional Descriptor
MO Management Object
MM Mobility Management
MTC machine type communications
OSS Operations support system
NR New Radio
NSSAI Network Slice Selection Assistance Information
PDCP Packet Data Convergence Protocol
RRC Radio Resource Control
SDL Specification and Description Language
SDM Subscription Data Management
SGW Serving GW
SCG Secondary Cell Group
URI Uniform Resource Identifier

BRIEF SUMMARY

This section is intended to include examples and is not intended to be limiting.

In an example of an embodiment, a method is disclosed that includes learning, by at least one device associated with a slice selection function, a slice reselection decision for at least one self-operation case, determining, by the at least one device associated with the slice selection function, whether there are enough self-operation cases, requesting, at least one device associated with a management function, evaluate the enough self-operation cases in response to determining that there are enough self-operation cases, receiving evaluation results from the at least one device associated with the management function, and learning the evaluation results.

An example of an apparatus includes at least one processor; and at least one non-transitory memory including computer program code, the at least one memory and the computer program code configured to, with the at least one processor, cause the apparatus to learn a slice reselection decision for at least one self-operation case, determine whether there are enough self-operation cases, request, at least one device associated with a management function, evaluate the enough self-operation cases in response to determining that there are enough self-operation cases, receive evaluation results and learn the evaluation results.

An example of an apparatus includes at least one processor; and at least one non-transitory memory including computer program code, the at least one memory and the computer program code configured to, with the at least one processor, cause the apparatus to receive a request to evaluate at least one self-operation case, wherein the request is associated with a reselection decision for at least one device, evaluate the at least one self-operation case with wider information than associated with the at least one device, and send the evaluation results of the at least one self-operation case.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 6 is a Table 1 that includes data elements for the interfaces for the procedures described herein;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

In the example embodiments as described herein a method and apparatus may evaluate slice reselection experiences of a slice selection function and a management plane function and determine subsequent decisions (for example, learn) from the response.

Figure 1:
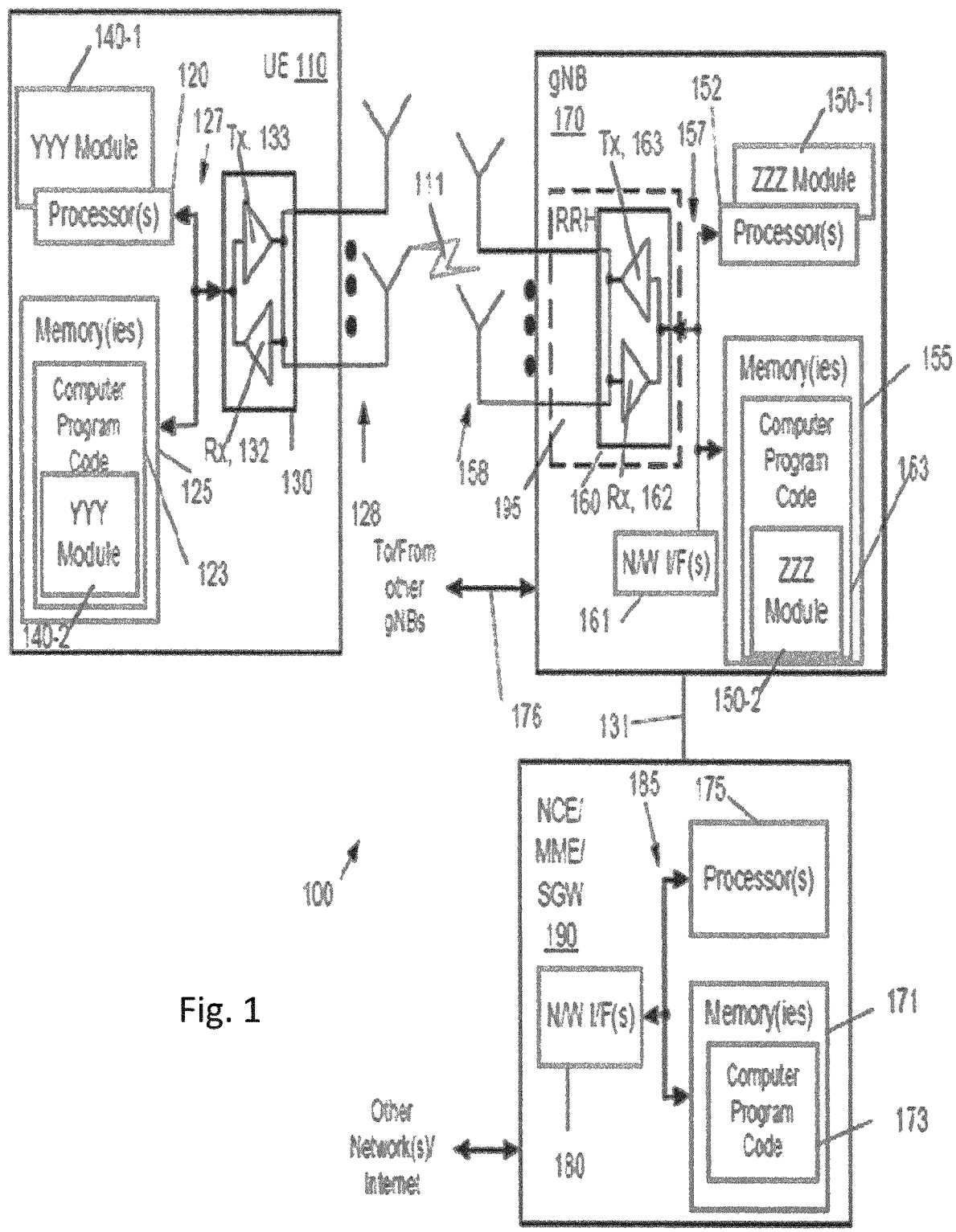
FIG. 1 is a block diagram of one possible and non-limiting example system in which the example embodiments may be practiced.

Turning to FIG. 1, this figure shows a block diagram of one possible and non-limiting example system in which the example embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a YYY module 140, comprising one of or both parts 140-1 and/or 140-2, which may be implemented in a number of ways. The YYY module 140 may be implemented in hardware as signaling module 140-1, such as being implemented as part of the one or more processors 120. The signaling module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with gNB 170 via a wireless link 111.

The gNB (NR/5G Node B but possibly an evolved NodeB) 170 is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 (or gNBs and eNBs) communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Some example embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Having thus introduced one suitable but non-limiting technical context for the practice of the example embodiments of this invention, the example embodiments will now be described with greater specificity.

Network slicing may allow a network operator to provide dedicated virtual networks with functionality specific to the service or customer (for example, associated with a UE 110) over a common network infrastructure. The network slice may include a set of network functions, and corresponding resources to support these network functions, which may form a complete instantiated logical network to meet certain network characteristics required by the service or customer.

In many instances, a UE 110 may request a slice reselection. For example, a UE 110 may request a slice reselection because the UE 110 is not satisfied with specific performance (for example, certain throughput for a particular application) that is monitored from the UE's 110 perspective and by the UE 110 itself. The UE 110 may report such observed data to the network side. Otherwise, the network side may not be aware of (for example, receive) this information and therefore may be unable to apply the data to increasing the accuracy of decision making for slice reselection.

A reason for a UE 110 to request slice reselection may be sent to the slice selection function. The reason for slice reselection may be, for example, one of "current slice about to get out of reach", "current slice unsatisfied", "better slice detected", etc. The network's decision on the reselection request may address problems or requirements associated with the UE 110 accurately. For example, a UE 110 may request the slice reselection of another slice because it is not satisfied with the current slice. The UE 110 may also be informed of reason (or reasons) for the network decision on its slice reselection request.

Many slice reselection requests may be sent to the slice selection function from the UEs 110 of the slice. These slice reselection requests originating from the UEs 110 may also provide the slice selection function the reasons (similar or different) behind each request. When receiving a slice reselection request, the slice selection function may determine a decision (for example, approval or rejection) on the request corresponding to the related context. The slice selection function may also include a reason for the decision in the response to the reselection request. This decision and the context may be learned (for example, analyzed and stored with respect to similar decisions) during the slice reselection experience. If the decision is "approval", the experience should also contain the later learnt estimation (for example, success or failure) of the reselection. The experience may be used to help provide more accurate future slice reselection under similar context. When the slice selection function makes a decision on a slice reselection request, the slice selection function may utilize information of the historical reselection experiences if the contexts of the previous slice reselection requests are similar with the context of the current slice reselection request. If the matching experiences support the approval, the current request is approved, otherwise the slice reselection request may be rejected.

Self-operation may act as an intelligent capability (for example, self-operation functionality) between any virtual/physical entities of the systems, such as described in "Self-operation of a network configured with potentially incomplete and inconsistent settings", February 2015 Publication number WO2016192746 A1, International Filing Date: 29 May 2015 and "Solution for self-operation to automatically define similarity measures and apply their matching operational experiences," September 2015, Publication number WO2016150627 A1, International Filing Date: 19 Feb. 2016, which are hereby incorporated by reference. Based on the interfaces between the virtual/physical entities of the systems, self-operation capability may learn and construct operation experiences (which may be referred to as self-operation cases) from the operations of the entities. Self-operation of a device/entity may provide recommendations to their operations based on its learned and imported experiences when given operations are similar to particular experiences known by self-operation capability.

A slice selection function is a control plane function. The focus of the slice selection function is to select a slice quickly and as correctly as possible (corresponding to the service). The slice selection function may make an estimation (for example, a rough estimation) of the selection result (success or failure) by monitoring a time that a UE 110 stays at the reselected slice. A management plane function may further evaluate the slice reselection result together with its wider related context visible at the management plane. However, the management plane function may perform at a much slower pace (e.g., in the order of minutes) than that of the slice selection (for example, in the order of milliseconds). It may not be feasible and scalable for a slice selection function to notify the management plane function for each instance or sub-instance (for example, piece) of slice reselection experience individually. Accordingly, the management plane function may receive and further evaluate multiple slice reselection experiences in a package together once per interval (for example, after a set number of minutes) or when a sufficient number of experiences are compiled in the package (for example, in batch mode).

Additionally, in some instances, decisions on slice reselection requests may be wrongly (for example, insufficiently, inefficiently, incorrectly or sub-optimally) made due to insufficient experiences at the slice selection function. The management plane function may analyze those experiences together with their wider related context visible at the management plane and determine if some slice reselection requests have been approved or rejected "wrongly". For example, the logic of slice reselection "correctly" selects a particular slice, while the (actual) result of the reselection may not be optimal (for example, good, efficient, etc.), for example, below expected quality of experience (QoE). The result may be detected by constant service assurance monitoring at the management plane. In this case, the management plane function may inform the slice selection function of the wrongly decided slice reselection requests, also in a scalable manner (for example, in batch mode). The slice selection function may then overwrite and update the result elements of their corresponding experiences (self-operation cases) accordingly. These newly learned experiences from the management plane function may prevent any similar future slice reselection requests from being wrongly decided.

In some instances, slice-related contexts may change. For example, statuses of networks, user devices, and user subscriptions may change. Some of the changes may not be visible to the slice selection function directly. Further, in some instances, some of the slice reselection experiences formerly learned by a slice selection function may become obsolete, while the slice selection function may not be informed of the formerly learned slice reselection experiences obsolescence (for example, the slice selection function may not know that the formerly learned slice reselection experiences are obsolete). In these instances, the slice selection function may make wrong decisions when the otherwise obsoleted experiences are used. The changes of slice-related contexts may be visible to the management plane function. The management plane function may then help the slice selection function to manage its corresponding slice reselection experiences. In this case, the slice selection function may be assisted (for example, helped, instructed, etc.) to identify and mark those obsoleted slice reselection experiences. For example, some attributes under a particular subscription type (for example, a Subscription Type 1) may be redefined. All the experiences related to Subscription Type 1 are to be marked as obsolete by the slice selection function, following the change notification. Otherwise, the slice selection function may make wrong (slice selection) decisions as current Subscription Type 1 may no longer be the same as the former Subscription Type 1, while both current and former Subscription Type 1 may be treated the same by the slice selection function in instances in which the slice selection function only compares their names in the learned experiences. Additionally, these newly obsoleted experiences may prevent any similar future slice reselection requests being wrongly decided by the slice selection function.

Some example embodiments described herein perform operations to support the following features (for example, provide features that implement solutions to questions).

Feature A) allows (a particular) slice selection function to inform (for example, transmit information regarding) the slice reselection experiences to the (a particular) management plane function.

Feature B) allows a management plane function to inform a slice selection function the information of the wrong decisions on slice reselection requests.

Feature C) allows a management plane function to inform the change of slice-related contexts to a slice selection function so that the corresponding slice reselection experiences may be managed (for example, to obsolete them or to put them back in use again).

Feature D) allows a slice selection function to learn new slice reselection experiences and manage its learned reselection experiences, based on the information from a management plane function.

Some example embodiments described herein provide solutions where (1) a slice selection function may request the deep evaluation of its given slice reselection experiences by a management plane function and learn (for example, determine changes to increase the accuracy of slice reselection experiences) from the response; (2) a management plane function may direct the corresponding management of slice reselection experiences, following a relevant status change. After the evaluation and management, the up-to-date slice reselection experiences may enable the slice selection function to make more accurate slice reselection decisions corresponding to the current contexts (for example, of slices, UE modes, users, user subscriptions, etc.). QoE may thereby be improved, extra wrong decisions may be prevented, and the unnecessary slice reselection requests may also be avoided.

Figure 2:
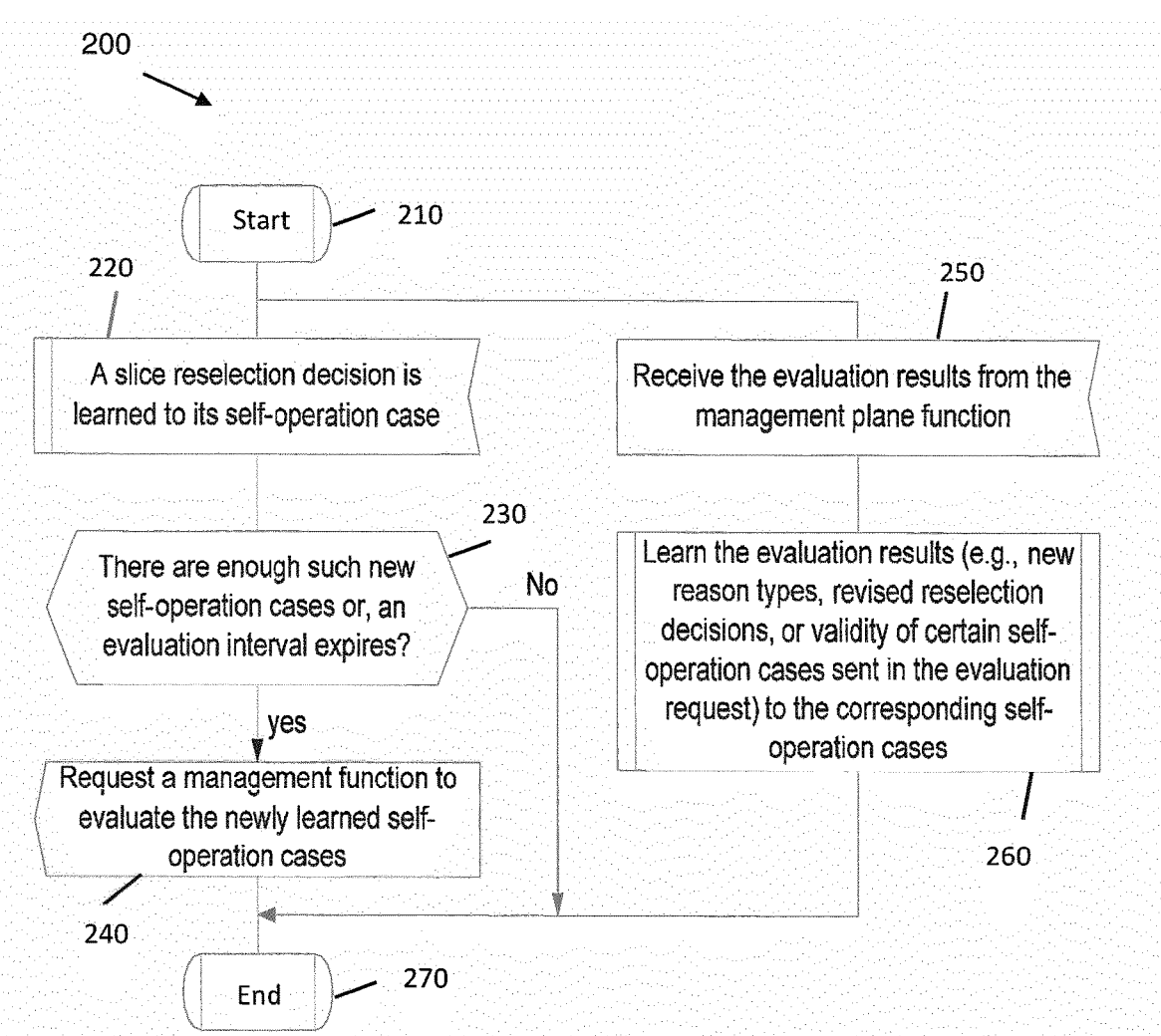
FIG. 2 is an SDL diagram of a procedure to evaluate slice reselection experiences executed at a slice selection function.
Figure 3:
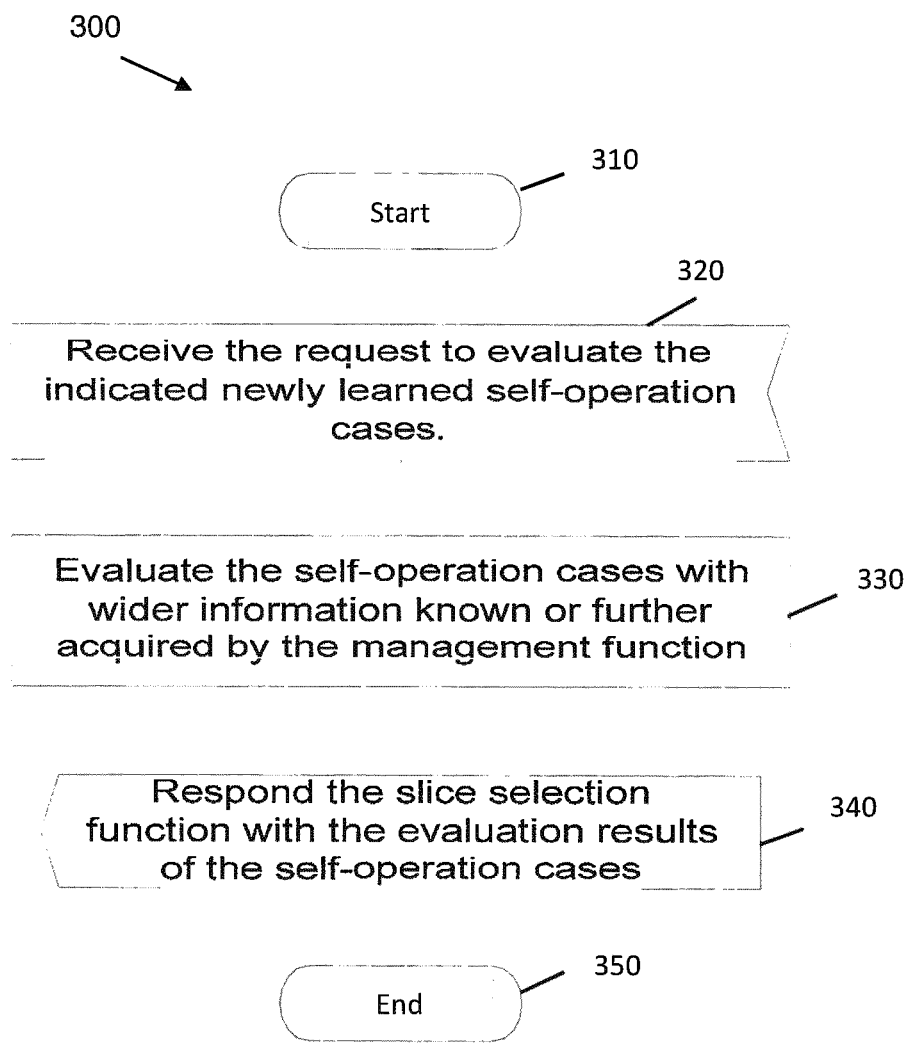
FIG. 3 is an SDL diagram of a procedure to evaluate slice reselection experiences executed at a management plane function.

FIGS. 2 and 3 illustrate SDL diagrams of the procedure to evaluate slice reselection experiences executed at a slice selection function (FIG. 2) and a management plane function (FIG. 3), respectively.

Referring now to FIG. 2, there is shown an SDL diagram of a procedure 200 to evaluate slice reselection experiences executed at a slice selection function, according to an example.

As shown in FIG. 2, procedure 200 may start 210, at slice selection function, for example when a condition occurs or instructions are received to evaluate slice reselection experiences. At step 220, a slice reselection decision may be learned for a self-operation case of the slice selection function. At step 230, the slice selection function may determine whether there are enough such new self-operation cases or whether a valuation interval has expired. If there are enough new self-evaluation cases, at step 240, the slice selection function may request a management function to evaluate the newly learned self-operation cases. If there are not enough new self-evaluation cases, the slice selection function may end (for example, bypass or refrain from making the request at step 240). In other instances, slice selection function may receive the evaluation results from management plane function (such as described with respect to FIG. 3) at step 250. Slice selection function may learn the evaluation results (for example, new reason types, revised reselection decisions, or validity of particular self-operation cases sent in the evaluation request) of the corresponding self-operation cases.

Referring now to FIG. 3, there is shown an SDL diagram of a procedure 300 to evaluate slice reselection experiences executed at a management plane function, according to an example.

As shown in FIG. 3, procedure 300 may start 310, at management plane function, for example when a slice selection function (at step 240 of FIG. 2, described hereinabove) requests a management function to evaluate newly learned self-operation cases. Management plane function may receive the request to evaluate the indicated newly learned self-operation cases at step 320. At step 330, management plane function may respond to the slice selection function with the evaluation results of the self-operation cases. At step 340 the procedure may end.

The experience evaluation procedure as illustrated in FIGS. 2 and 3, provides support for features A and B. This procedure may correct potential errors of rough estimation of a slice reselection result (success or failure) by a slice selection function. A rough estimation may be performed through monitoring a time that a UE 110 stays at the reselected slice. In a scalable manner, a management plane function may receive and further evaluate multiple slice reselection experiences in a package together once per interval (for example, minutes) or when sufficient number of experiences in the package (for example, in batch mode). The management plane function may further evaluate the slice reselection results together with their wider related contexts visible at the management plane. Then, the management plane function may send the results of the further evaluation back to the slice selection function, so that similar future errors may be prevented from the rough estimation based on the evaluation of the results (for example, at first instances of future slice reselection decisions).

In addition, some decisions on slice reselection requests may also be wrongly made by the slice selection function due to potentially insufficient experiences. The management plane function may analyze the slice reselection experiences of the received package together with their wider related context visible at the management plane. The management plane function may determine if some slice reselection requests have been approved or rejected wrongly. In instances in which the slice reselection requests have been approved or rejected wrongly, the management plane function may inform the slice selection function of those wrongly decided slice reselection requests, also in a scalable manner (for example, in batch mode). The slice selection function may then correct the result elements of their corresponding experiences (for example, in self-operation cases) accordingly. These newly learned experiences from the management plane function may prevent any similar future slice reselection requests being wrongly decided. For example, in instances in which the management plane function detects that a resulting performance is below the expected/required level at a later time, this information may indicate an actual failure of the reselection, regardless of whether the UE 110 is still staying at the reselected slice or not. Therefore, the management plane function may send the information to the slice selection function for experience correction.

Figure 4:
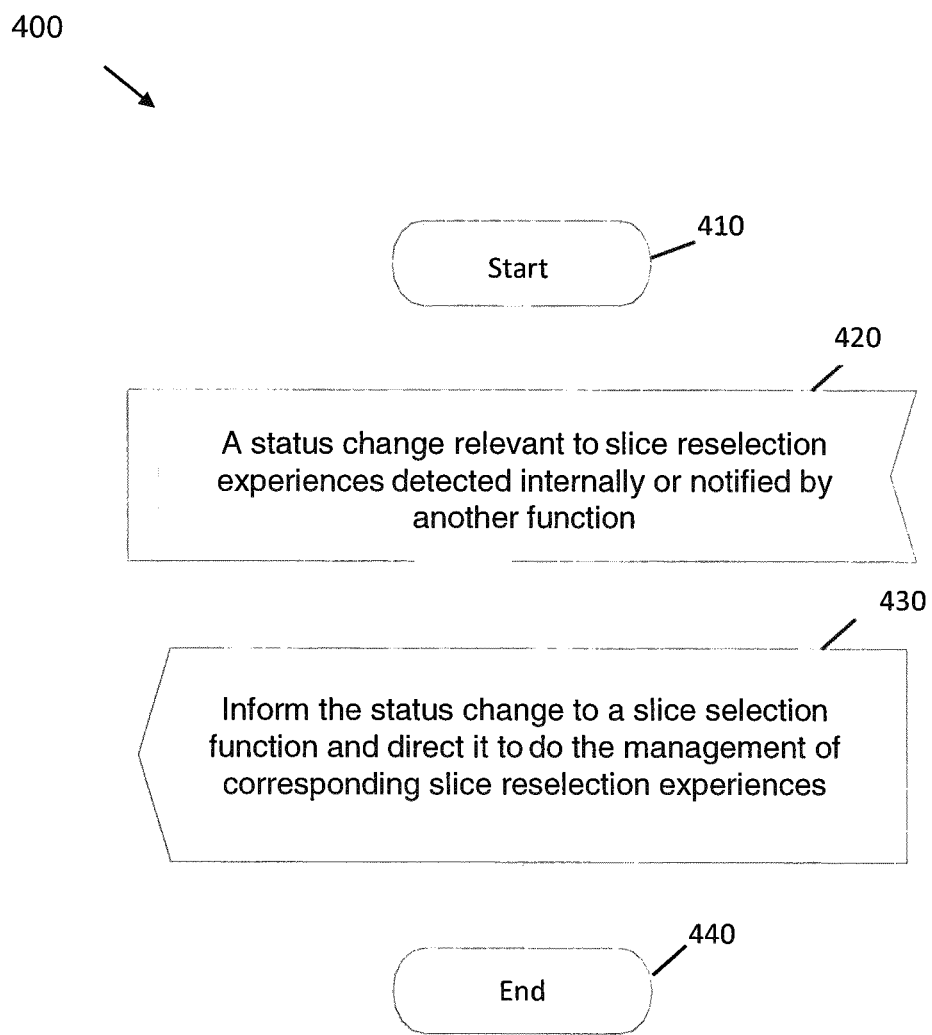
FIG. 4 is an SDL diagram of a procedure to manage slice reselection experiences according to new status executed at a management plane function.
Figure 5:
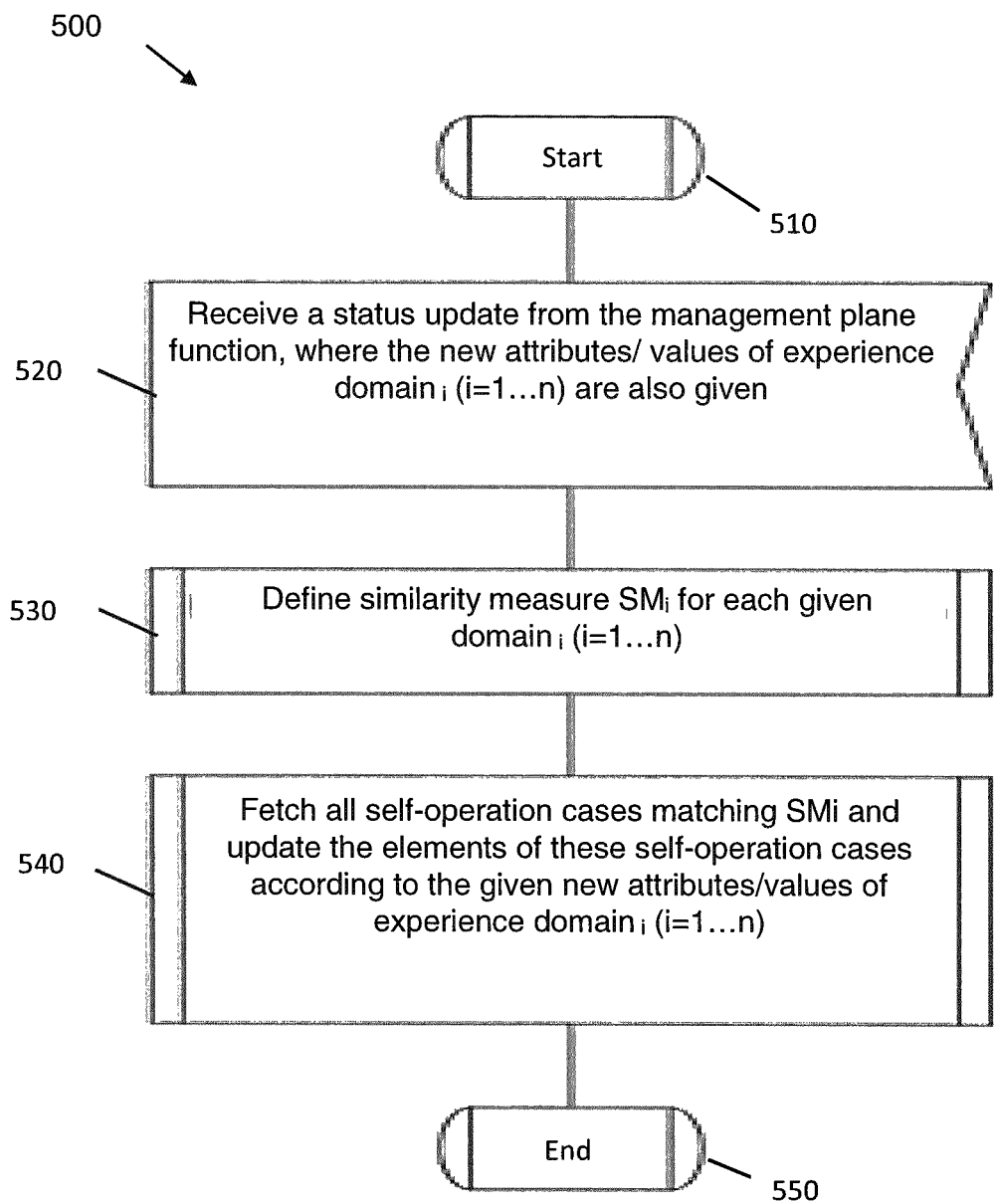
FIG. 5 is an SDL diagram of a procedure to manage slice reselection experiences according to new status executed at a slice selection function.

FIGS. 4 and 5 illustrate SDL diagrams of a procedure to manage slice reselection experiences according to new status executed at a management plane function (FIG. 4) and a slice selection function (FIG. 5), respectively.

Referring now to FIG. 4, there is shown a SDL diagram of a procedure to manage slice reselection experiences according to new status executed at a management plane function.

As shown in FIG. 4, procedure 400 may start 410, at management plane function, for example when status changes relevant to slice reselection experiences occur. Management plane function may, at step 420, detect a status change relevant to slice reselection experiences (for example, internally or via notification sent by another function). At step 430, management plane function may send information (and, in some instances, instructions) to the slice selection function that may direct the slice selection function to perform management of the corresponding slice reselection experiences. At step 440, the procedure may end.

Referring now to FIG. 5, there is shown an SDL diagram of a procedure to manage slice reselection experiences according to new status executed at a slice selection function.

As shown in FIG. 5, procedure 500 may start 510, at slice selection function, for example when a condition occurs or instructions are received to evaluate slice reselection experiences. At step 520, a slice selection function may receive a status update from the management plane function, where the new attributes/values of experience domain i (i=1 ... n) are also given. At step 530, the slice selection function may define similarity measure $SM_i$ for each given domain i (i=1 ... n). At step 540, the slice selection function may fetch all self-operation cases matching SMi and update the elements of these self-operation cases according to the given new attributes/values of experience domain i (i=1 ... n). At step 550 the procedure may end.

FIGS. 4 and 5 describes an experience management procedure, which may be used to support (for example, achieve/solve execution of) features C and D. The experience management procedure may be used to address the experience issues of the following cases.

Case 1. In instances in which particular attribute values of learned self-operation cases become invalid, the corresponding self-operation cases may effectively become invalid. For example, a particular subscription type (Subscription Type 1) may be redefined by a business support system (BSS) function. If the Subscription Type attribute in a self-operation case has only the value 1 (for example, the subscription type just has a name but no other attributes under it), that subscription change is not visible with regards to the self-operation case. However, the self-operation case may not be valid anymore. If not excluded specifically by experience management, this invalid experience may impact negatively or incorrectly the slice reselection. In this case, if the management plane function determines that the experience is invalid, the management plane function may inform the slice selection function to perform the relevant experiences management. In order to update the relevant experiences, a specific similarity measure may be (automatically) defined for each experience domain (defined in Table 1, shown in FIG. 6, described herein below) concerning the changed attributes informed by the management function. Such similarity measure (each of them) may then be used by the slice selection function to match the corresponding self-operation cases and update them accordingly.

Case 2. A similarity measure (for applying particular experiences) may be defined with only some (but not all) of the attributes and values of the self-operation cases. In some instances, a search from the experience database may return those matching self-operation cases, where some attributes/values of them may have become invalid due to recent updates/changes in context. Such self-operation cases should be excluded from the matching self-operation cases, so that only valid experiences can be used as the matching experiences. In this situation, if the management function knows of self-operation cases that should be excluded, the management function may inform the slice selection function to perform the relevant experiences management of these cases. The experiences management may be performed through (Option 1) directly updating the self-operation cases or (Option 2) attaching the invalidity info as a constraint for a similarity measure (for example, to upgrade the similarity measure to include this invalidity info as an attribute) when searching and managing the matching experiences.

FIG. 6 illustrates table 1, data storage table 600, which includes new data elements for the interfaces concerning the procedures for evaluating slice reselection experiences of a slice selection function and a management plane function and determine subsequent decisions from the response. Table 1 includes a column for data elements 610, definitions and attributes 620 and transmit information 630.

The following defined data elements 610 (Table 1) may be added to the interfaces (itf-N/S and OSS-BSS interface). The data elements 610 are related to a slice selection function, a management plane function, and a BSS (Business Support System) function. These data elements 610 may be used by the experience evaluation procedure (FIGS. 2 and 3) and the experience management procedure (FIGS. 4 and 5) to support/implement features A) to D).

As shown in FIG. 6, Table 1 includes a data element column 610 and corresponding definition and attribute 640 and transmit information 630 columns. The data element column 610 includes data elements that may be used to implement evaluation of slice reselection experiences of a slice selection function and a management plane function and determination of subsequent decisions based on the response. Column 620 describes definitions and attributes of each of the data elements. Column 630 describes how the data element may be sent between (for example, across) different interfaces while implementing the evaluation and determination.

selectionExp 640 is the category name for a slice reselection experience, which indicates that its associated data elements are specific self-operation case(s) identified by their own self-operation case IDs (for example, a Record_id). A slice selection function may use selectionExp 640 when requesting a management plane function to evaluate specific reselection experiences (for example, a set of self-operation cases). A management plane function may use selectionExp 640 to direct a slice selection function to update the specific reselection experiences after the evaluation. selectionExp 640, as shown in column 630, may be sent between itf-N/S interface (for example, itf-N for the interface between Element Management System (EMS) and Network Element System (NMS), and itf-S for the interface between Network Element and Element Management System (EMS)).

Device model 645 is the experience domain name for a specific part of experience(s) concerning UE 110's product name (for example, a particular model of a device (for example, IPHONE® 7 Plus (Global)) and firmware (for example, IOS 10.3.1)). Application 650 is the experience domain name for a specific part of experience(s) concerning application (for example, a particular application (for example, Showbox®, version 4.82), and optionally a part/whole info of Device Model, (for example, IPHONE @7 Plus (Global) and IOS® 10.3.1.). User Subscription (User Sub) 655 is the experience domain name for a specific part of experience(s) concerning user subscription (e.g., IMSI, Subscription Type change) or concerning Subscription Type a (Subscription Definition Change) for all users. MO 660 is the experience domain name for a specific part of experience(s) concerning a management object (for example, MOID, new values for attribute $x(v_x)$, $y(v_y)$, $z(v_z)$.). Each of device model 645, application 650, user sub 655, and MO 660 are a specific expDomain and may be sent among itf-N/S and OSS-BSS interfaces.

Attribute 665 is the name of an attribute of an experience domain, which may be sent together with its value as an instance through the interfaces among a slice selection function, a management plane function, and a BSS function. Attribute 665 may be sent among itf-N/S and OSS-BSS interfaces.

Self-operation case 670 is an experience data instance sent through the interface between a slice selection function and a management plane function. Element of a self-operation case 675 is the name of an element/attribute of a self-operation case, which may be sent together with its value as an instance through the interface between a slice selection function and a management plane function. URI of self-operation case 680 is a uniform resource identifier of a self-operation case, sent through the interface between a slice selection function and a management plane function. URI is a string of characters used to identify a resource. Self-operation case 670, element of a self-operation case 675, and URI of self-operation case 680 may be sent between itf-N/S interfaces.

"expDomain" may represent one of the experience domain names defined in Table 1, for example, Device Model 645, Application 650, User Subscription 655, and MO 660. An experience domain name for a specific part of experience(s) indicates that its associated data elements concern those slice reselection experiences (specific self-operation cases) carrying the data of the domain. A BSS function may inform a management plane function regarding the specific change concerning a domain. For example, the BSS function may receive notification (for example, receive notice or discover via monitoring, etc.) the change of the user subscription for a specific user or for a subscription type. A management plane function may also notice (for example, monitor and determine, receive notification, etc.) the change of certain network status concerning a domain. For example, the management plane function may notice the change of network status for a management object (MO) 660. The management plane function may then direct the experience management of the slice selection experiences concerning a domain. For example, the management plane function may direct the experience management of all the slice selection experiences concerning a specific device model.

UE 110 reported experiences which have led the UE to request a slice reselection due to dissatisfaction with the current slice may be collected. There may be different factors or reasons that the UE 110 reports when requesting a slice reselection. The reasons for requesting a slice reselection may be collected and stored as experience cases in a local self-operation database. The Common Control Network Function (CCNF) (for example, Network Slice Selection Function) may utilize this information locally in a cell belonging to a particular slice. Based on knowledge regarding earlier slice reselections (for example, stored information about prior slice reselections pertinent to current slice selection) regarding how slice reselections have been accomplished (accepted/rejected) for a particular context (including, for example, UE 110 type, software (for example, machine implementable computer language), user subscription data, application type, slice type, etc.) the network control function may determine what to do (for example, a particular course of action) when a UE 110 reports dissatisfaction with a current slice (with similar context) and requests a slice reselection consequently. CCNF may either reject the request or attach the UE 110 to another slice if supported by the subscription data (MDD/NSSAI). This feature may be referred to as Network Initiated Slice Reselection.

In instances in which a slice (or a particular cell in the slice) becomes low in service quality (for example, below a predetermined QoE, etc.), the system may enable a slice reselection to another slice (if the slice belongs to the same tenant as the tenant may have several different slices designed for different business purposes on the same area overlapping with each other) and the service type in the next slice approximately corresponds with the current slice. If the UE subscription allows (by MDD/NSSAI) the attachment to the other slice(s) then the UE 110 may make a slice reselection to another slice in an attempt to get better service quality at the other slice. If the UE subscription does not allow attachment to the other slice, the UE 110 may thereafter request slice reselection (for example, within a predetermined time).

Figure 7:
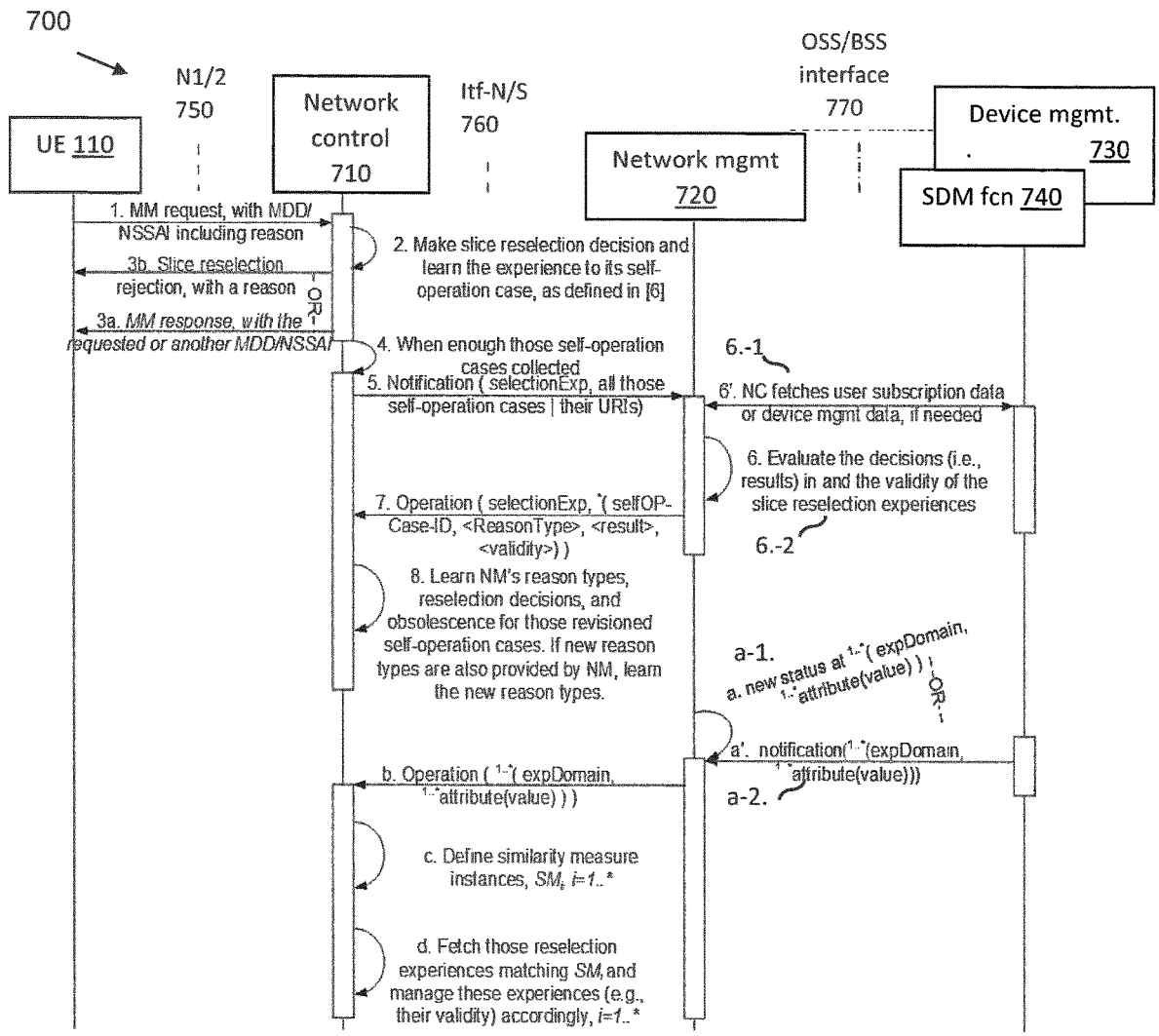
FIG. 7 is an action diagram of an example implementation of the procedures.

FIG. 7 is an action diagram 700 of an example implementation evaluation of slice reselection experiences of a slice selection function and a management plane function and determination of subsequent decisions based on the response. Action diagram 700 may include UE 110, network control 710, network management 720 (for example, NMS/EMS), Device management (mgmt.) 730, and SDM function (fcn) 740. The systems/devices may communicate via N1/2 750, itf-N/S 760 and OSS/BSS 770 interfaces.

FIGS. 4 and 5 include two parts, (Part 1) the evaluation of newly learned slice reselection experiences and (Part 2) the management of slice reselection experiences following relevant status change, for example, a network status change or user status change. FIG. 7 illustrates implementation of Parts 1 and Part 2.

As shown in FIG. 7, implementation of Part 1 may include messages 1 to 3, which may have been defined, for example based on processes such as described in NC102597, "Experience-based reselection of a network slice". Message 1 may include an MM request, with MDD/NSSAI including one or more reasons from UE 110 to Network control 710. At step (for example, action) 2, the network control 710 may make a slice reselection decision and learn the experience to its self-operation case. At step (for example, message) 3, Network control 710 may then send (for example, notify of) a slice rejection (for example, via N1/2 750), with at least one reason (shown as message 3b). Alternatively, if approved, the network control 710 may send an MM response, (message 3a) with the requested or another MDD/NSSAI. Message 3a may include, for example, an MM response, with the requested or another MDD/NSSAI.

Network control 710, at action 4, may trigger the experience evaluation process by a management plane function, when there have been enough new self-operation cases learned from the recent slice reselections by a slice selection function. Message 5 may include a message sent from the slice reselection function to a management plane function. This message may carry the newly learned self-operation cases or their URIs (for example, hyperlinks) and may request a management plane function (for example, at network management 720) to evaluate these self-operation cases, with emphasis on analysis of their results in some instances. When the management plane function receives Message 5, the management plane function may access (for example, fetch, retrieve or receive) particular user subscription data or device management data with Messages 6-1, if needed, from device management 730 and SDM function 740. The management plane function may then evaluate (at action 6-2) the received self-operation cases, including their reason types, results (for example, decisions) and validity of the slice reselection experiences. The evaluation conclusions may then be configured back to the slice selection function with Message 7. The slice selection function may learn the evaluation conclusions, if any, including revised reason types, reselection decisions, and validity of those evaluated self-operation cases. The system may implement reselection of a network slice and may now use the evaluated and revised (for example, up-to-date) experiences for more accurate decision making regarding the further slice re-selection requests.

FIG. 7 further illustrates Part 2 in which a status change may occur to the network. Whenever a management plane function detects the change of network status that is relevant to the slice selection function, the management plane function may trigger the experience management operation by action a. A BSS function may also detect the change of user status (for example, status of device, subscription, etc.), and the BBS function may trigger the experience management operation by sending a peer message a' to the management plane function. The management plane function may then send an operation to the slice selection function and informs the slice selection function of the new attributes/values of the corresponding experiences domain(s). When the slice selection function receives the new attributes/values of the corresponding experiences domain(s), it automatically defines a specific similarity measure ($SM_i$) per each received $domain_i$ according to the name of the domain and its new attributes/values. Then, the slice selection function may retrieve those reselection experiences (self-operation cases) matching per defined SM and update the element(s) of the matching experiences according to the new attributes/values of the domain, iteratively until all given domains are updated.

A similarity measure (for example, SM) may be defined automatically as following.

$$SM=\{name\ of\ expDomain,^1 \cdots {}^*attribute(value)\}.$$

For example, $SM_j=\{$Application, application type (for example, Showbox (v4.82)®), Device Model (device type (for example, IPHONE 7 Plus® (Global)), operating system type (for example, IOS 10.3.1))$\}$.

Figure 8:
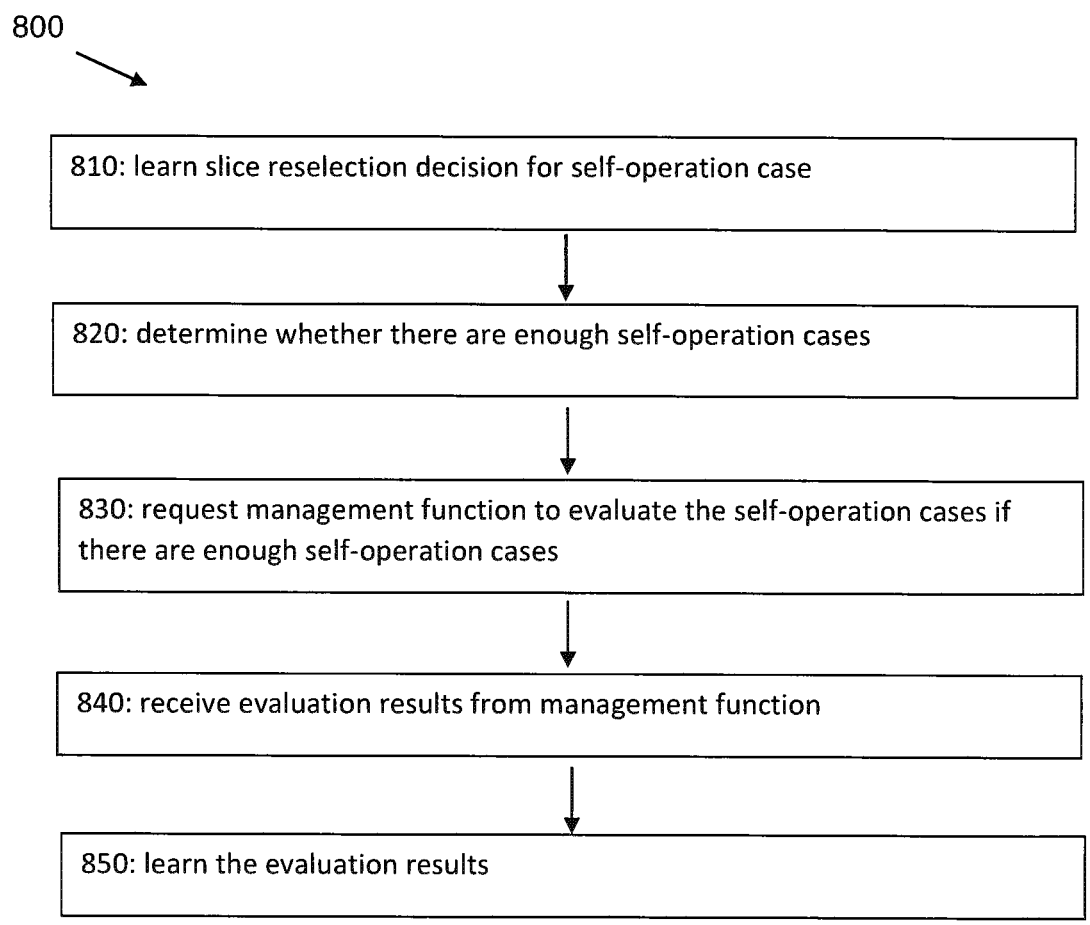
FIG. 8 shows a method in accordance with example embodiments which may be performed by an apparatus.

FIG. 8 is an example flow diagram 800 illustrating evaluation and management of slice selection experiences.

At block 810, a slice reselection function, implemented at network control 710, may learn a slice reselection decision for a self-operation case of a UE 110. For example, network control 710 may receive, from a UE 110, an MM request, for example a slice reselection request, which includes MDD/NSSAI and at least one reason. For example, the UE 110 may send the MM request via an N1/2 interface when the UE 110 a slice selection function determines that slice reselection is needed. Network control 710 may make a slice reselection decision. The network control 710 may learn the experience to its self-operation case, for example, based on experience-based reselection of a network slice. Network control 710 may send a slice reselection rejection with a reason (such as described with respect to message 3b of FIG. 7 hereinabove). Alternatively, network control 710 may allow the slice reselection.

At block 820, network control 710 may determine whether enough (for example, a batch of) self-operation cases have been collected or an interval has expired. Network control 710 may send, to network management 720, multiple slice reselection experiences in a package together once per interval (say, minutes) or when network control 710 has compiled a sufficient number of experiences in the package (for example, in batch mode). Network control 710 may send the self-operation cases to network management 720 via an itf-N/S interface.

At block 830, if there are enough new cases (block 820, yes), network control 710 may request a management function to evaluate the newly learned self-operation cases. For example, network control 710 may send a notification, which may include selectionExp 640 (for example, a category name for a slice reselection experience), the self-operation cases and their URIs, to network management 720.

At block 840, network control 710 may receive evaluation results from the management plane function. For example, network control 710 may receive instructions for an operation from network management 720. Network management 720 may have evaluated decisions and validity of slice reselection experiences, in some instances after retrieving user subscription and/or device management data. The instructions may include selectionExp 640 and a selfOp-Case-ID, reason type, result and validity.

At block 850, network control 710 may learn network management's reason types, reselection decisions and obsolescence for the revisioned self-operation cases. If new reason types are also provided by network management 720, network control 710 may learn the new reason types.

Without in any way limiting the scope, interpretation, or application of the claims appearing below, a technical effect of one or more of the example embodiments disclosed herein is that management function may identify any wrong slice reselection decisions in the learned experiences from a slice selection function, in a timely manner. A slice selection function may learn the new experiences from the wrong slice reselection decisions identified by the management plane function. The newly learned experiences may prevent any similar future slice reselection requests been wrongly decided again. Network performance and QoE may therefore be improved.

Another benefit is that a management plane function may identify any change in the slice-related contexts and inform such change to a slice selection function, in a timely manner. The slice selection function may thereby manage its learned slice reselection experiences corresponding to the informed change. For example, a particular slice (for example slice 1) may be scaled out. Experiences with slice 1 may be marked as obsolete by the slice selection function, following the change notification. The slice selection function may thereby avoid making wrong decision as current slice 1 may not be the former slice 1, while the slices may be treated the same if only comparing their names in the learned experiences by the slice selection function. The slice selection function may make slice reselection decisions based on its up-to-date slice reselection experiences. Some example embodiments may prevent those unnecessary wrong decisions caused by obsoleted slice reselection experiences and therefore improve network performance and QoE.

Another benefit is that experience-based slice reselection with the procedures and example embodiments may provide capability in network slice management product portfolio to enhance slice reselection for the users. Some example embodiments may further enhance/improve the functionality of the Network Slice Selection Function (NSSF), which may be included as a part of the CCNF.

An example embodiment may provide a method comprising learning, by at least one device associated with a slice selection function, a slice reselection decision for at least one self-operation case, determining, by the at least one device associated with the slice selection function, whether there are enough self-operation cases, requesting, at least one device associated with a management function, evaluate the enough self-operation cases in response to determining that there are enough self-operation cases, receiving evaluation results from the at least one device associated with the management function, and learning the evaluation results.

In accordance with an example embodiment learning at least one of at least one new reason type, at least one revised reselection decision, and a validity of particular of the enough self-operation cases.

In accordance with an example embodiment determining whether there are enough new self-operation cases or a predetermined time interval has expired.

In accordance with an example embodiment up-to-date slice reselection experiences enable the slice selection function to make more accurate slice reselection decisions corresponding to at least one current context.

In accordance with an example embodiment receiving, at the at least one device associated with the management function, a request to evaluate the enough self-operation cases, evaluating the enough self-operation cases with wider information; and sending, from the at least one device associated with the management function, the evaluation results of the enough self-operation cases.

In accordance with an example embodiment evaluating the enough self-operation cases based on at least one of a device model domain, an application domain and a user subscription domain.

In accordance with an example embodiment evaluating the enough self-operation cases based on at least one of a management object domain and an attribute domain.

In accordance with an example embodiment evaluating the enough self-operation cases based on at least one of a particular self-operation case, an element of the particular self-operation case, and a Uniform Resource Indicator (URI) of the particular self-operation case.

In accordance with an example embodiment determining that a status change is relevant to at least one slice reselection experience, providing a notification of the status change to at least one device associated with a slice selection function and directing the at least one device associated with the slice selection function to perform management of at least one slice reselection experience corresponding to the status change.

In accordance with an example embodiment receiving, at the at least one device associated with the slice selection function, an update including the status change, wherein the update includes at least one new attribute of at least one experience domain, defining a similarity measure (SM) for each of the at least one experience domain, retrieving self-operation cases matching SM, and updating elements of the self-operation cases matching SM based on the at least one new attribute of the at least one experience domain.

An example embodiment may be provided in an apparatus comprising at least one processor; and at least one non-transitory memory including computer program code, the at least one non-transitory memory and the computer program code may be configured to, with the at least one processor, cause the apparatus to: learn a slice reselection decision for at least one self-operation case, determine whether there are enough self-operation cases, request, at least one device associated with a management function, evaluate the enough self-operation cases in response to determining that there are enough self-operation cases, receive evaluation results and learn the evaluation results.

In accordance with an example embodiment the computer program code are further configured to, with the at least one processor, cause the apparatus to learn at least one of at least one new reason type, at least one revised reselection decision, and a validity of particular of the enough self-operation cases.

In accordance with an example embodiment the computer program code are further configured to, with the at least one processor, cause the apparatus to learn at least one of at least one new reason type, at least one revised reselection decision, and a validity of particular of the enough self-operation cases.

In accordance with an example embodiment up-to-date slice reselection experiences enable the slice selection function to make more accurate slice reselection decisions corresponding to at least one current context.

In accordance with an example embodiment the computer program code are further configured to, with the at least one processor, cause the apparatus to receive an update including a status change, wherein the update includes at least one new attribute of at least one experience domain, define a similarity measure (SM) for each of the at least one experience domain, retrieve self-operation cases matching SM, and update elements of the self-operation cases matching SM based on the at least one new attribute of the at least one experience domain.

An example embodiment may be provided in an apparatus comprising at least one processor; and at least one non-transitory memory including computer program code, the at least one non-transitory memory and the computer program code may be configured to, with the at least one processor, cause the apparatus to: receive a request to evaluate at least one self-operation case, wherein the request is associated with a reselection decision for at least one device, evaluate the at least one self-operation case with wider information than associated with the at least one device, and send the evaluation results of the at least one self-operation case.

In accordance with an example embodiment the computer program code are further configured to, with the at least one processor, cause the apparatus to evaluate the at least one self-operation case based on at least one of a device model domain, an application domain and a user subscription domain.

In accordance with an example embodiment the computer program code are further configured to, with the at least one processor, cause the apparatus to evaluate the at least one self-operation case based on at least one of a management object domain and an attribute domain.

An example embodiment may provide a non-transitory computer program product comprising a computer-readable medium bearing computer program code embodied therein for use with a computer, the computer program code comprising learning, by at least one device associated with a slice selection function, a slice reselection decision for at least one self-operation case, determining, by the at least one device associated with the slice selection function, whether there are enough self-operation cases, requesting, at least one device associated with a management function, evaluate the enough self-operation cases in response to determining that there are enough self-operation cases, receiving evaluation results from the at least one device associated with the management function, and learning the evaluation results.

An example embodiment may provide anon-transitory computer program product comprising a computer-readable medium bearing computer program code embodied therein for use with a computer, the computer program code comprising receiving a request to evaluate at least one self-operation case, wherein the request is associated with a reselection decision for at least one device, evaluating the at least one self-operation case with wider information than associated with the at least one device, and sending the evaluation results of the at least one self-operation case.

In accordance with another example, an example apparatus comprises: means for learning, by at least one device associated with a slice selection function, a slice reselection decision for at least one self-operation case, means for determining, by the at least one device associated with the slice selection function, whether there are enough self-operation cases, requesting, at least one device associated with a management function, evaluate the enough self-operation cases in response to determining that there are enough self-operation cases, means for receiving evaluation results from the at least one device associated with the management function, and means for learning the evaluation results.

In accordance with another example, an example apparatus comprises: means for receiving, by at least one device associated with the management function, a request to evaluate at least one new self-operation case, means for evaluating the at least one new self-operation case with wider information, and means for sending, from the at least one device associated with the management function, the evaluation results of the at least one new self-operation case.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   learning, by at least one device associated with a slice selection function, a slice reselection decision for at least one self-operation case;
   determining, by the at least one device associated with the slice selection function, whether an evaluation condition for at least one new self-operation case has been met, wherein the at least one new self-operation case includes the at least one self-operation case;
   sending, by the at least one device associated with the slice selection function, a request to at least one device associated with a management function, to evaluate the at least one new self-operation case in response to determining that the evaluation condition has been met;
   receiving, from the at least one device associated with the management function, evaluation results; and
   learning the evaluation results.

2. The method of claim 1, wherein learning the evaluation results further comprises learning at least one of at least one new reason type, at least one revised reselection decision, and a validity of a particular case of the at least one new self-operation case.

3. The method according to claim 1, wherein determining whether the evaluation condition has been met further comprises determining that at least one of a number of new self-operation cases equals a predetermined threshold or a that a predetermined time interval has elapsed.

4. The method according to claim 1, further comprising:
   sending, by the at least one device associated with the slice reselection function and to the at least one device associated with the management plane function, a message, wherein the message includes at least one of the at least one new self-operation case and at least one uniform resource identifier for the at least one new self-operation case, and wherein the message comprises a request for the management plane function to evaluate the at least one new self-operation case.

5. The method according to claim 1, further comprising:
   receiving a notification of a status change and instructions to perform management of at least one slice reselection experience corresponding to the status change, wherein the status change is relevant to at least one slice reselection experience.

6. The method according to claim 1, further comprising:
   receiving, at the at least one device associated with the slice selection function, an update including a status change, wherein the update includes at least one new attribute of at least one experience domain;

defining a similarity measure for each at least one experience domain;

retrieving self-operation cases matching similarity measure; and updating elements of the self-operation cases matching similarity measure based on the at least one new attribute of the at least one experience domain.

7. An apparatus, comprising:

at least one processor; and at least one memory including computer program code, the at least one memory and the computer program code configured to, with the at least one processor, cause the apparatus to at least:

learn a slice reselection decision for at least one self-operation case;

determine whether an evaluation condition for at least one new self-operation case has been met, wherein the at least one new self-operation case includes the at least one self-operation case;

send, to at least one device associated with a management function, a request to evaluate the at least one new self-operation case in response to determining that the evaluation condition has been met;

receive evaluation results; and learn the evaluation results.

8. The apparatus of claim 7, wherein to learn the evaluation results, the at least one memory and the computer program code are further configured to, with the at least one processor, cause the apparatus to at least:

learn at least one of at least one new reason type, at least one revised reselection decision, and a validity of a particular case of the at least one new self-operation case.

9. The apparatus of claim 7, wherein to determine whether the evaluation condition has been met, the at least one memory and the computer program code are further configured to, with the at least one processor, cause the apparatus to at least:

determine that at least one of a number of new self-operation cases equals a predetermined threshold or that a predetermined time interval has elapsed.

10. The apparatus of claim 7, wherein the at least one memory and the computer program code are further configured to, with the at least one processor, cause the apparatus to at least:

send, to the at least one device associated with the management plane function, a message, wherein the message includes at least one of the at least one new self-operation case and at least one uniform resource identifier for the at least one new self-operation case, and wherein the message comprises a request for the management plane function to evaluate the at least one new self-operation case.

11. The apparatus of claim 7, wherein the at least one memory and the computer program code are further configured to, with the at least one processor, cause the apparatus to at least:

receive an update including a status change, wherein the update includes at least one new attribute of at least one experience domain;

define a similarity measure for each at least one experience domain;

retrieve self-operation cases matching the similarity measure; and update elements of the self-operation cases matching the similarity measure based on the at least one new attribute of the at least one experience domain.

12. An apparatus, comprising:

at least one processor; and at least one memory including computer program code, the at least one memory and the computer program code configured to, with the at least one processor, cause the apparatus to at least:

receive a request to evaluate at least one self-operation case, wherein the request is associated with a reselection decision for at least one device;

evaluate the at least one self-operation case with wider context information, when compared to the context information associated with the at least one device; and send the evaluation results of the at least one self-operation case.

13. The apparatus of claim 12, wherein to evaluate the at least one self-operation case with the wider information, the at least one memory and the computer program code are further configured to, with the at least one processor, cause the apparatus to at least:

evaluate the at least one self-operation case based on at least one of a device model domain, an application domain, a user subscription domain, and a network domain.

14. The apparatus of claim 12, wherein the apparatus is further configured to evaluate the at least one self-operation case based on at least one of a management object domain and an attribute domain.

15. The apparatus of claim 12, wherein the apparatus is further configured to evaluate the at least one self-operation case based on at least one of a particular self-operation case, an element of the particular self-operation case, and a uniform resource identifier of the particular self-operation case.

16. The apparatus of claim 12, wherein the at least one memory and the computer program code are further configured to, with the at least one processor, cause the apparatus to at least:

receive, from at least one device associated with a slice reselection function, a message, wherein the message includes at least one of the at least one self-operation case and at least one uniform resource identifier for the at least one self-operation case, and wherein the message comprises a request for the apparatus to evaluate the at least one self-operation case;

retrieve at least one of user subscription data and device management data; and evaluate the at least one self-operation case based on the user subscription data and/or the device management data.

* * * * *